United States Patent
Otts et al.

(10) Patent No.: US 12,102,200 B2
(45) Date of Patent: Oct. 1, 2024

(54) SYSTEM AND KIT FOR REPLENISHING AN ELECTROWETTING OPHTHALMIC DEVICE

(71) Applicant: TWENTY TWENTY THERAPEUTICS LLC, South San Francisco, CA (US)

(72) Inventors: Daniel Otts, Pleasanton, CA (US); Stein Kuiper, South San Francisco, CA (US)

(73) Assignee: TWENTY TWENTY THERAPEUTICS LLC, South San Francisco, CA (US)

( * ) Notice: Subject to any disclaimer, the term of this patent is extended or adjusted under 35 U.S.C. 154(b) by 913 days.

(21) Appl. No.: 17/030,736

(22) Filed: Sep. 24, 2020

(65) Prior Publication Data

US 2021/0096400 A1  Apr. 1, 2021

Related U.S. Application Data

(60) Provisional application No. 62/906,539, filed on Sep. 26, 2019.

(51) Int. Cl.
*A45C 11/00* (2006.01)
*C11D 3/00* (2006.01)
(Continued)

(52) U.S. Cl.
CPC .......... *A45C 11/005* (2013.01); *C11D 3/0078* (2013.01); *G02B 1/043* (2013.01); *G02C 7/085* (2013.01); *G02C 2202/18* (2013.01)

(58) Field of Classification Search
CPC ........ A45C 11/005; G02B 1/043; G02B 1/10; G02B 26/005; G02B 27/0006;
(Continued)

(56) References Cited

U.S. PATENT DOCUMENTS 4,852,591 A * 8/1989 Wisotzki .............. G02C 13/008
366/279
5,011,661 A   4/1991 Schäfer et al.
(Continued)

FOREIGN PATENT DOCUMENTS

CN    207281412 U * 4/2018 ............... B08B 3/12

OTHER PUBLICATIONS

Leslie E. O'Dell, "Tear Osmolarity in a Glaucoma Practice" 2016, Glaucoma Today pp. 26-27 (Year: 2016).*
(Continued)

*Primary Examiner* — Nicholas R. Pasko
*Assistant Examiner* — Samanvitha Sridhar
(74) *Attorney, Agent, or Firm* — Christensen O'Connor Johnson Kindness PLLC

(57) ABSTRACT

Systems and kits for replenishing an electrowetting ophthalmic device are described. In an embodiment, the system includes an electrowetting ophthalmic device including a lens material defining a cavity encasing an aqueous electrowetting solution; a replenishing solution having an osmolarity approximately equal to an osmolarity of the aqueous electrowetting solution; and a container shaped to carry the electrowetting ophthalmic device and the replenishing solution and to position the electrowetting ophthalmic device in contact with the replenishing solution when the electrowetting ophthalmic device and the replenishing solution are carried by the container. In an embodiment, the osmolarity of the aqueous electrowetting solution is higher than an osmolarity of a tear fluid of an eye.

15 Claims, 6 Drawing Sheets

(51) Int. Cl.
*G02C 7/08* (2006.01)
*G02B 1/04* (2006.01)

(58) Field of Classification Search
CPC .. G02C 7/085; G02C 2202/18; C11D 3/0078; C25D 13/00; C25D 17/02; A61F 2/1613; A61F 2/1618; A61F 2/1624; A61F 2/1627; A61F 2/1635
USPC ........... 351/159; 204/489; 359/665; 514/840
See application file for complete search history.

(56) References Cited

U.S. PATENT DOCUMENTS

| | | | |
|---|---|---|---|
| 6,183,705 B1* | 2/2001 | Chang | G02C 13/008 |
| | | | 422/301 |
| 8,919,953 B1 | 12/2014 | Ho | |
| 10,591,414 B2* | 3/2020 | Gavaris | G01N 21/553 |
| 10,869,753 B1* | 12/2020 | Otts | A61F 2/1635 |
| 11,338,976 B2* | 5/2022 | Oag | H02J 7/0042 |
| 2007/0030573 A1 | 2/2007 | Batchko et al. | |
| 2007/0195261 A1 | 8/2007 | Vogt et al. | |
| 2010/0233023 A1* | 9/2010 | Kanner | A61L 12/086 |
| | | | 422/30 |
| 2012/0268712 A1* | 10/2012 | Egan | G02C 7/04 |
| | | | 351/159.34 |
| 2013/0229618 A1 | 9/2013 | Otts et al. | |
| 2014/0002790 A1* | 1/2014 | Pugh | G02B 3/14 |
| | | | 351/159.39 |
| 2015/0281411 A1* | 10/2015 | Markus | A45C 11/005 |
| | | | 455/556.1 |
| 2017/0182201 A1* | 6/2017 | Tucker | A61L 12/10 |
| 2018/0078669 A1 | 3/2018 | Otts | |
| 2018/0217402 A1* | 8/2018 | Larmagnac | G02B 3/14 |
| 2018/0280135 A1 | 10/2018 | Otts | |
| 2018/0318068 A1 | 11/2018 | Otts et al. | |

OTHER PUBLICATIONS

International Search Report and Written Opinion, mailed Jan. 7, 2021, in corresponding International Patent Application No. PCT/US2020/052513, 9 pages.

* cited by examiner

SYSTEM AND KIT FOR REPLENISHING AN ELECTROWETTING OPHTHALMIC DEVICE

CROSS-REFERENCE(S) TO RELATED APPLICATION

This application claims the benefit of U.S. Provisional Application No. 62/906,539, filed Sep. 26, 2019, which is hereby incorporated by reference in its entirety.

TECHNICAL FIELD

This disclosure relates generally to electrowetting ophthalmic devices, and, in particular but not exclusively, relates to electrowetting ophthalmic devices that are gas- and water-permeable.

BACKGROUND INFORMATION

Certain ophthalmic devices provide accommodating changes in optical power based upon electrowetting. Such electrowetting generally operates by changing an apparent surface energy of a dielectric coating on an electrode from hydrophobic to hydrophilic when bias is applied, and vice versa. The apparent change in surface energy may cause an interface between two immiscible liquids of different refractive indices, such as an oil and a saline solution, to change shape, thereby providing a lensing effect. A voltage applied to the electrode may attract or repel one of the two immiscible liquids, which causes the shape of the interface to change.

An osmolarity of an aqueous solution disposed within an electrowetting ophthalmic device is susceptible to change as an osmolarity of a tear fluid of an eye changes. Such changes in osmolarity of the aqueous solution can have deleterious effects on optical performance of the electrowetting ophthalmic device.

BRIEF DESCRIPTION OF THE DRAWINGS

Non-limiting and non-exhaustive embodiments of the claimed subject matter are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system and kit for replenishing an electrowetting ophthalmic device are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

An osmolarity of tear fluid can vary over time, depending, for example, on tear production rate, drainage rate, and evaporation rate. For example, in dry and windy conditions the evaporation rate of tears increases, which leads to an increase in salt concentration in the tear fluid. This higher salt concentration may attract water from an electrowetting ophthalmic device, including any internal saline volume in an electrowetting fluid chamber, in contact with the tear fluid, particularly if a lens material is water-permeable. If dry and/or windy conditions persist for several days, such effects may interfere with stable optical performance of the electrowetting ophthalmic device, such as due to swelling or shrinking of the electrowetting ophthalmic device based on an osmotic pressure gradient.

Toward that end, the present disclosure provides systems and kits for replenishing electrowetting ophthalmic devices. As set forth in greater detail below, in some embodiments, the systems and kits of the present disclosure include a replenishing solution having an osmolarity approximately equal to an osmolarity of the aqueous electrowetting solution, such as an initial or preferred osmolarity of the aqueous electrowetting solution, for replacing or replenishing water and solutes lost to osmosis and/or evaporation.

Figure 1A:
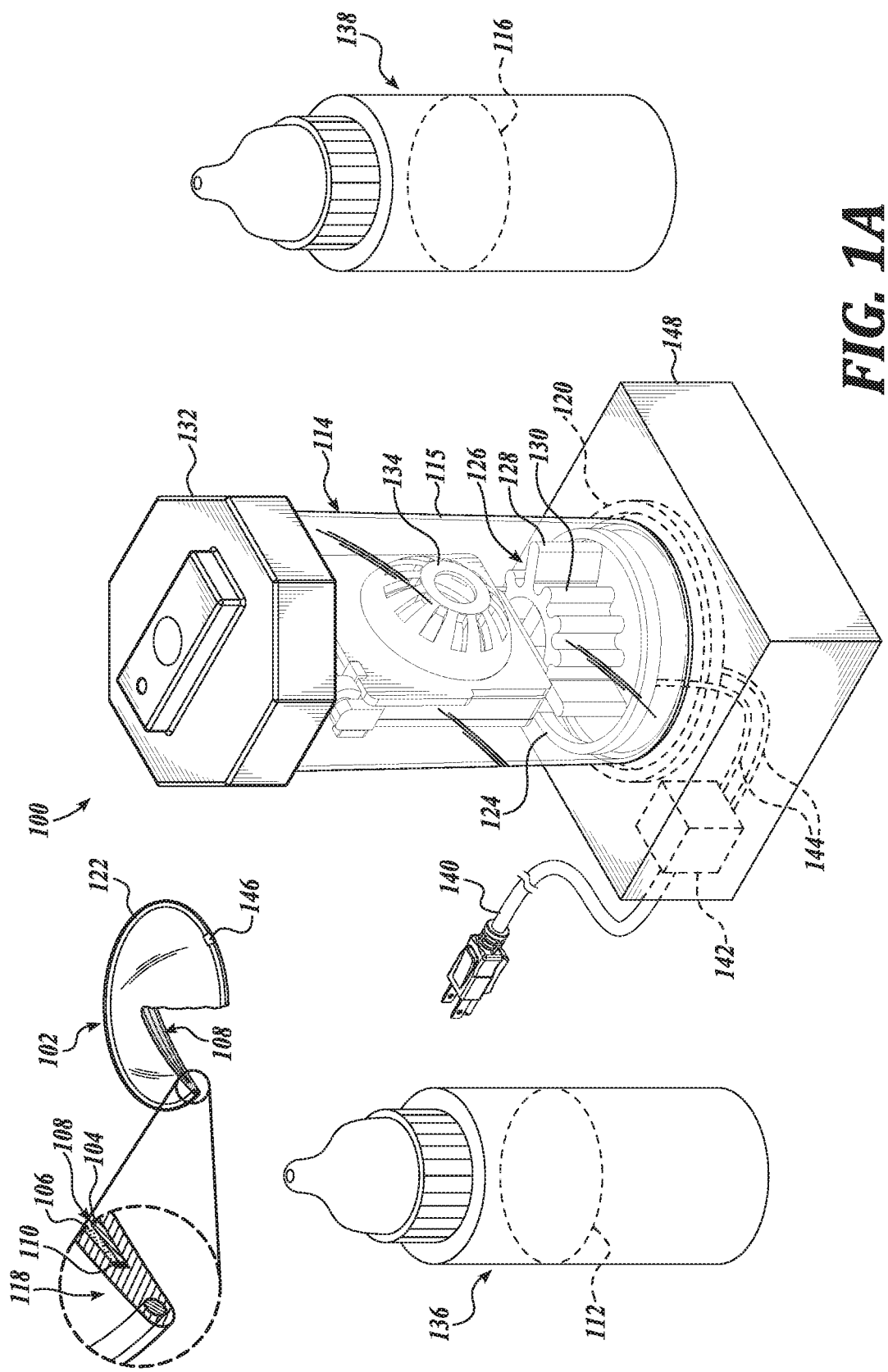
FIG. 1A is a perspective view of a system, in accordance with an embodiment of the disclosure.
Figure 1B:
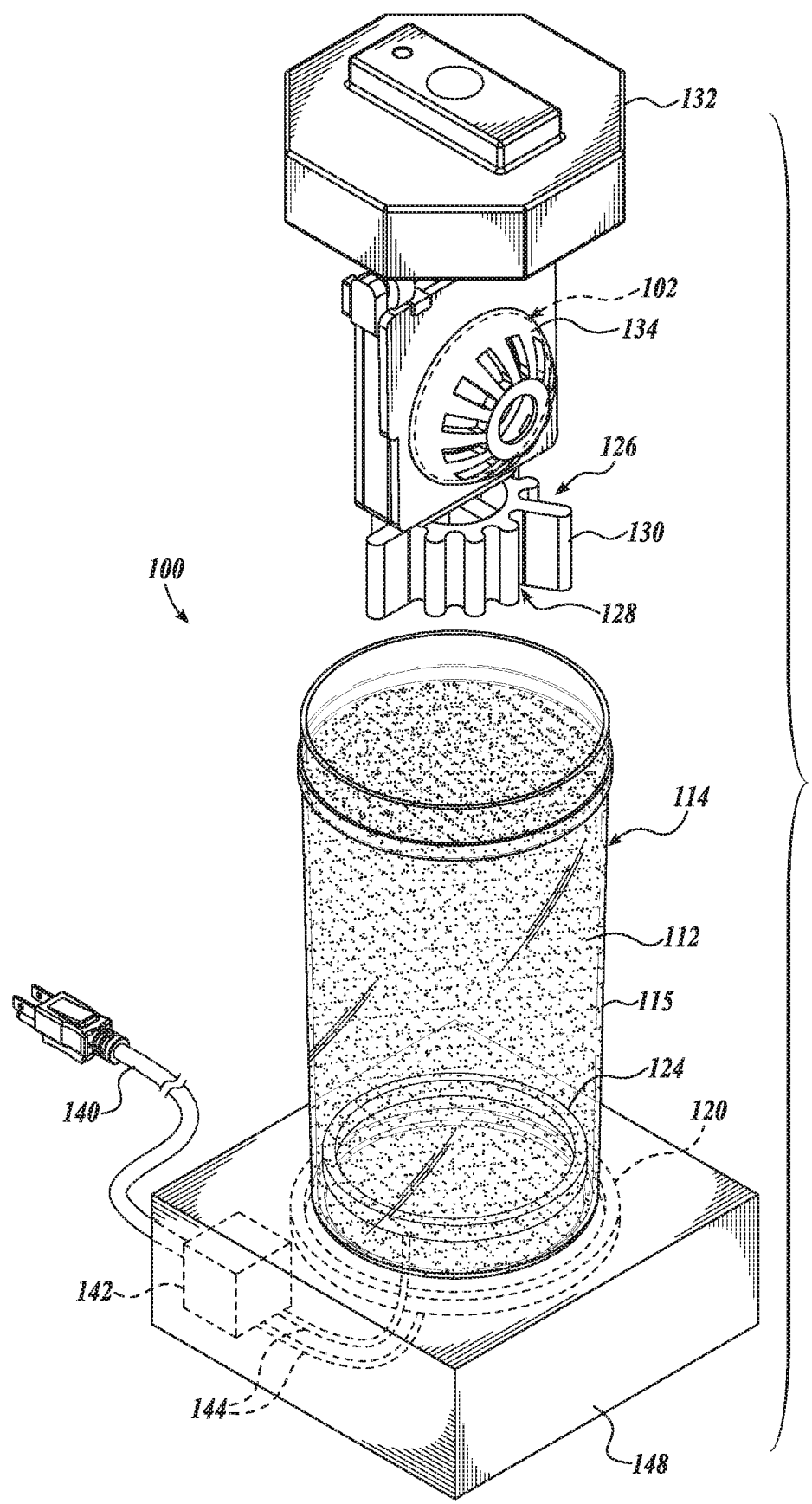
FIG. 1B is a perspective view of a container of the system of FIG. 1A, in accordance with an embodiment of the disclosure.
Figure 1C:
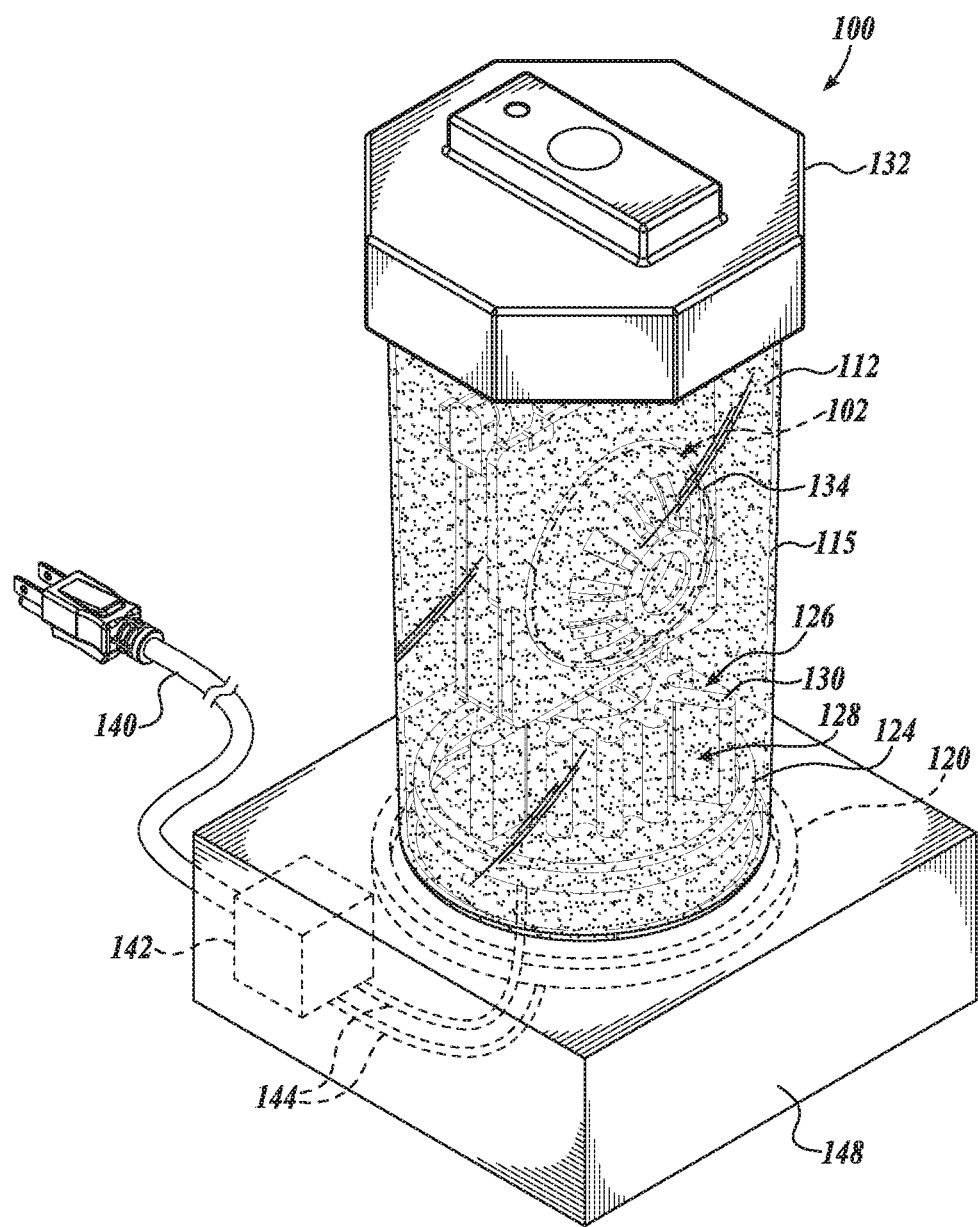
FIG. 1C is another perspective view of the container of the system of FIG. 1A, in accordance with an embodiment of the disclosure.
Figure 1D:
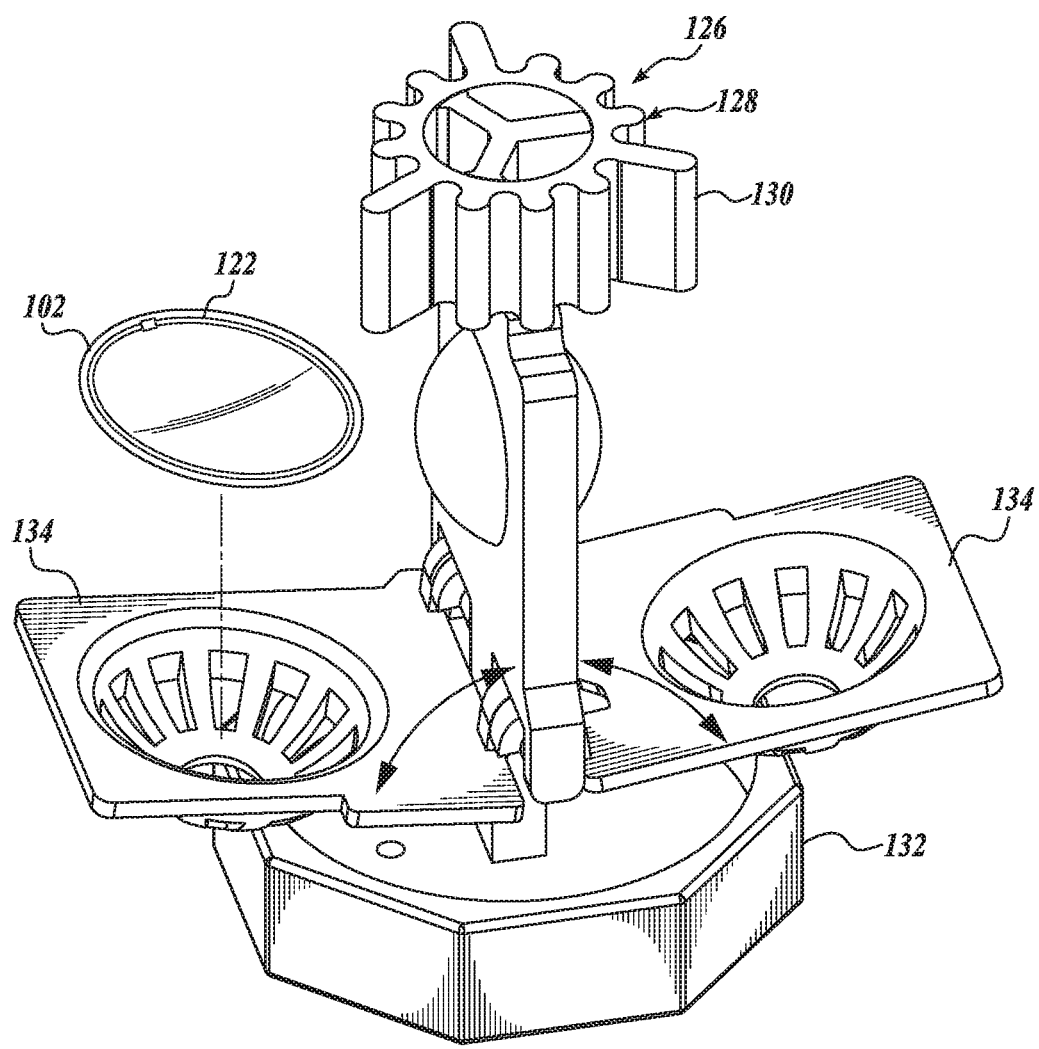
FIG. 1D is a partial view of the container of the system of FIG. 1A, in accordance with an embodiment of the disclosure.

FIGS. 1A-1D illustrate a system 100, in accordance with an embodiment of the disclosure. FIG. 1A is a perspective view of a system 100, in accordance with an embodiment of the disclosure. FIG. 1B is a perspective view of a container 114 of the system 100, in accordance with an embodiment of the disclosure. FIG. 1C is another perspective view of the container 114 of the system 100, in accordance with an embodiment of the disclosure. FIG. 1D is a partial view of the container 114 of the system 100, in accordance with an embodiment of the disclosure.

System 100 is shown to include an electrowetting ophthalmic device 102, a replenishing solution 112, and a container 114 shaped to carry the electrowetting ophthalmic device 102 and the replenishing solution 112. The electrowetting ophthalmic device 102 includes a lens material 118, such as a rigid gas-permeable lens material 118, defining a cavity 108 carrying two immiscible liquids, here an oil 106 and an aqueous electrowetting solution 104. As shown, the oil 106 and the aqueous electrowetting solution 104 contact a dielectric material 110 configured to change an optical power of the electrowetting ophthalmic device 102. In the illustrated embodiment, the electrowetting ophthalmic device 102 is an electrowetting accommodating contact lens 102 shaped to mount to a corneal surface of an eye.

In an embodiment, the lens material 118 is a rigid gas-permeable lens material that is permeable to gases including, for example, water vapor. In this regard, water of the aqueous electrowetting solution 104 can move from within the cavity 108, for example, to a tear fluid of an eye. As the electrowetting ophthalmic device 102 is exposed to dry and/or windy conditions, an osmolarity of the aqueous electrowetting solution 104 changes. Such changes in osmolarity may change optical performance of the electrowetting ophthalmic device 102.

As above, the system 100 includes a replenishing solution 112. In an embodiment, the replenishing solution 112 includes ions common to the aqueous electrowetting solution 104. In an embodiment, the replenishing solution 112 has an osmolarity equal to or approximately equal to an initial or preferred osmolarity of the aqueous electrowetting solution 104. In this regard, an aqueous electrowetting solution 104 of the electrowetting ophthalmic device 102, such as an aqueous electrowetting solution 104 having a low salt concentration relative to an initial or preferred osmolarity, may be replenished by contacting the electrowetting ophthalmic device 102 with the replenishing solution 112.

Without wishing to be bound by theory, it is believed that ions of the replenishing solution 112 in contact with the electrowetting ophthalmic device 102 do not appreciably move through the lens material 118. The lens material 118 is, however, permeable to water vapor, such as water vapor from the replenishing solution 112. In this regard, water in the replenishing solution 112 can move through the lens material 118 and into the cavity 108 due, for example, to an osmotic pressure between the aqueous electrowetting solution 104 and the replenishing solution 112. Where a starting or preferred osmolarity of the aqueous electrowetting solution 104 and an osmolarity of the replenishing solution 112 are approximately equal, a solute equilibrium may be reached which does not apply an osmotic pressure on the lens material 118 sufficient to distort or distend the lens material 118 and alter optical properties of the electrowetting ophthalmic device 102. In this regard, an aqueous electrowetting solution 104 can be replenished, that is to say water in the aqueous electrowetting solution 104 can be replaced, where water of the aqueous electrowetting solution 104 was depleted due, for example, to a high concentration of a tear fluid of an eye in contact with the electrowetting ophthalmic device 102.

In addition to water for replenishment of the aqueous electrowetting solution 104, the replenishing solution 112 can further include one or more surfactants. Such surfactants are suitable for cleaning and/or disinfecting the electrowetting ophthalmic device 102. In an embodiment, the surfactants are configured not to accumulate within the electrowetting ophthalmic device 102, such as within the lens material 118 of the electrowetting ophthalmic device 102 or solutions encased therein. In this regard, the surfactants are configured to remain generally outside of the cavity 108 of the electrowetting ophthalmic device 102 and generally do not interfere with or affect the optical properties of the electrowetting ophthalmic device 102. Accordingly, in an embodiment, the surfactants have an average molecular weight of about 2,000 g/mole. Further, in an embodiment, the surfactants have a hydrophilicity/lipophilicity balance of about 20. In an embodiment, the surfactants have a hydrophilicity/lipophilicity balance greater than 20. In an embodiment, the surfactants have a hydrophilicity/lipophilicity balance in a range of about 15 to about 20. In an embodiment, a hydrophilicity/lipophilicity balance is measured according to Griffin's method. Such surfactants, having a relatively high molecular weight and hydrophilicity/lipophilicity balance, are not retained within the lens material 118 and do not generally move through the lens material 118 and into the cavity 108.

In an embodiment, the lens material 118 has a relatively low specific water uptake, such as in a range of 0.2% to 0.5% w/w. Such a specific water uptake is suitable to facilitate replenishment of the electrowetting solution 104 resulting in a preferred osmolarity. Such a characteristic is suitable, in certain instances, to achieve a preferred or initial osmolarity of the electrowetting in a relatively short replenishment time, such as overnight. As above, the container 114, including a container body portion 115, is shaped to carry the electrowetting ophthalmic device 102 and the replenishing solution 112. As shown, the system 100 includes a replenishing solution container 136 carrying the replenishing solution 112, which may be used to dispense the replenishing solution 112 into the container body portion 115. In the illustrated embodiment, the container 114 includes a cap 132 and cages 134 shaped to hold the electrowetting ophthalmic device 102. As shown in FIGS. 1B and 1C, the cap 132 and cages 134 may be separated from a container body portion 115, such as to place the electrowetting ophthalmic device 102 in the cages 134. The cages 134 are hingedly coupled to the cap 132 and may be positioned such that a user can place the electrowetting ophthalmic device 102 in the cages 134, such as for replenishing in the replenishing solution 112. See FIG. 1D. The container 114 is shown to include two cages 134 and in this regard, can carry two electrowetting ophthalmic devices, such as a pair of electrowetting contact lenses.

In an embodiment, the container body portion 115 is shaped to carry a volume of replenishing solution 112 sufficient to replenish every electrowetting ophthalmic device 102 carried by the container. In an embodiment, the container body portion 115 is shaped to carry about 5 mL of replenishing solution 112 for each electrowetting ophthalmic device 102 carried by the container 114.

The cages 134 carrying the electrowetting ophthalmic device 102 may be disposed in the replenishing solution 112, such as by cooperatively coupling the cap 132 to the container body portion 115, as shown in FIG. 1C. In this regard, the container 114 is shaped to position the electrowetting ophthalmic device 102 in contact with the replenishing solution 112 when the electrowetting ophthalmic device 102 and the replenishing solution 112 are carried by the container 114. As above, by placing the electrowetting ophthalmic device 102 in contact with the replenishing solution 112, an aqueous electrowetting solution 104 of electrowetting ophthalmic device 102 is replenished, such as by replacing water removed through evaporation and osmosis.

In an embodiment, an osmolarity of the aqueous electrowetting solution 104 is higher than an osmolarity of a tear fluid of an eye. Accordingly, even as the osmolarity of a tear fluid in contact with the electrowetting ophthalmic device 102 increases, such as due to dry and/or windy conditions, net water flow is towards the aqueous electrowetting solution 104 so long as the osmolarity of the aqueous electrowetting solution 104 is sufficiently high. In this regard, optical properties of the electrowetting ophthalmic device 102 are less susceptible to changes induced by changes in osmolarity of tear fluids. Further, an aqueous electrowetting solution 104 having an osmolarity greater than a tear fluid is suitable to decrease the likelihood of bubble formation in the cavity 108. An underpressure due to water loss from the aqueous electrowetting solution 104 may result in formation of bubbles in the aqueous electrowetting solution 104. It is preferable that an osmolarity of the aqueous electrowetting solution 104 is higher than that of the tear fluid, so that the electrowetting ophthalmic device 102 never operates under negative pressure. In an embodiment, the osmolarity of the aqueous electrowetting solution 104 is high enough that the lens material 118 is just below the limit of acceptable deformation. In an embodiment, the osmolarity of the aqueous electrowetting solution 104 is greater than 290 mOsmol/L. In an embodiment, the osmolarity of the aqueous electrowetting solution 104 is in a range of about 290 mOsmol/L to about 500 mOsmol/L.

As above, in an embodiment, the replenishing solution 112 has an osmolarity approximately equal to an initial or preferred osmolarity of the aqueous electrowetting solution 104. In an embodiment, the osmolarity of the replenishing solution 112 is greater than 290 mOsmol/L. In an embodiment, the osmolarity of the replenishing solution 112 is in a range of about 290 mOsmol/L to about 500 mOsmol/L. A replenishing solution 112 having relatively high osmolarities, such as a replenishing solution 112 having an osmolarity higher than an osmolarity of a tear fluid, may cause discomfort to a wearer's eyes. In this regard, when the electrowetting ophthalmic device 102 has been replenished in a replenishing solution 112 having a relatively high osmolarity, a user can utilize rinsing solution 116 to rinse the replenishing solution 112 from the electrowetting ophthalmic device 102 before mounting the electrowetting ophthalmic device 102 to an eye. In an embodiment, such a rinsing solution 116, shown here disposed in rinsing solution container 138, has an osmolarity approximately equal to the osmolarity of a tear fluid of an eye, thus providing greater comfort to the eyes of a wearer. In an embodiment, an osmolarity of the rinsing solution 116 is less than 290 mOsmol/L. In an embodiment, an osmolarity of the rinsing solution is in a range of about 150 mOsmol/L to about 290 mOsmol/L.

In an embodiment, the container 114 includes an agitator 126 positioned to agitate replenishing solution 112 carried by the container 114. By agitating the replenishing solution 112 disposed in the container 114, an equilibrium between the replenishing solution 112 and the aqueous electrowetting solution 104 can be achieved more quickly, such as in a time period normally used for cleaning and/or disinfecting the electrowetting ophthalmic device 102, such as overnight during a period of 6-8 hours. Such an agitator 126 can include a bubbler, a propeller, a pump, and the like. In the illustrated embodiment, the agitator 126 includes a catalyst 128 disposed in the container body portion 115 and positioned to contact the replenishing solution 112 carried by the container 114. Such a catalyst 128 may be configured to degrade a peroxide, such as hydrogen peroxide, in the replenishing solution 112 to generate a gas. In an embodiment, the peroxide is also suitable to clean the electrowetting ophthalmic device 102. When the gas is generated at a sufficient rate it forms bubbles, which agitate the replenishing solution 112. As shown, the catalyst 128 is coupled to the cap 132 and defines a number of fins 130 shaped to increase an amount of surface area in contact with the replenishing solution 112, thereby increasing a rate at which the peroxide is degraded. In an embodiment, the fins 130 are shaped to generate gas bubbles in a substantially even distribution with the replenishing solution 112 to agitate the replenishing solution during cleaning and replenishing of the electrowetting ophthalmic device 102. In an embodiment, the catalyst 128 is a platinum catalyst 128. In an embodiment, the catalyst 128 is statically coupled such that it does not rotate or otherwise move relative to the cap 132.

The system 100 is shown to further include a heat source 124 positioned to heat the replenishing solution 112 carried by the container. As shown, the heat source 124 is disposed within the container body portion 115 in contact with the replenishing solution 112. In an embodiment, the heat source 124 is coupled to the container body portion 115. The container 114 is shown to further include a controller 142 disposed in a base portion 148 of the container 114 and operatively coupled to the heat source 124 by electrical connection 144; and an electrical plug 140 operatively coupled to the controller 142 and coupleable to an electrical power source. In an embodiment, the controller 142 includes logic that, when executed by the controller 142, causes the system 100 to perform operations including heating the replenishing solution 112 in contact with the heat source 124. By heating the replenishing solution 112, an equilibrium, such a salt-concentration equilibrium between the replenishing solution 112 and the aqueous electrowetting solution 104 can be established more quickly than in the absence of heating. In an embodiment, the heat source 124 is configured to generate heat through electrical resistive heating. In an embodiment, the heat source 124 includes a heat pump.

The system 100 is shown to further include a transmitter 120 positioned in or on the container 114 to inductively couple with a receiver 122 of the electrowetting ophthalmic device 102 to transfer power wirelessly to the electrowetting ophthalmic device 102 when the electrowetting ophthalmic device 102 is carried within the container 114. In the illustrated embodiment, the transmitter 120 is operatively coupled to controller 142 through electrical connection 144 to receive electrical power therefrom. In an embodiment, the controller 142 includes logic that, when executed by the controller 142, causes the system 100 to perform operations including wirelessly transmitting power for receipt by the receiver 122 of the electrowetting ophthalmic device 102. Such power received by the receiver 122 is configured to be stored in the ophthalmic device power source 146, such as for later use in changing an optical power of the electrowetting ophthalmic device 102.

Figure 3:
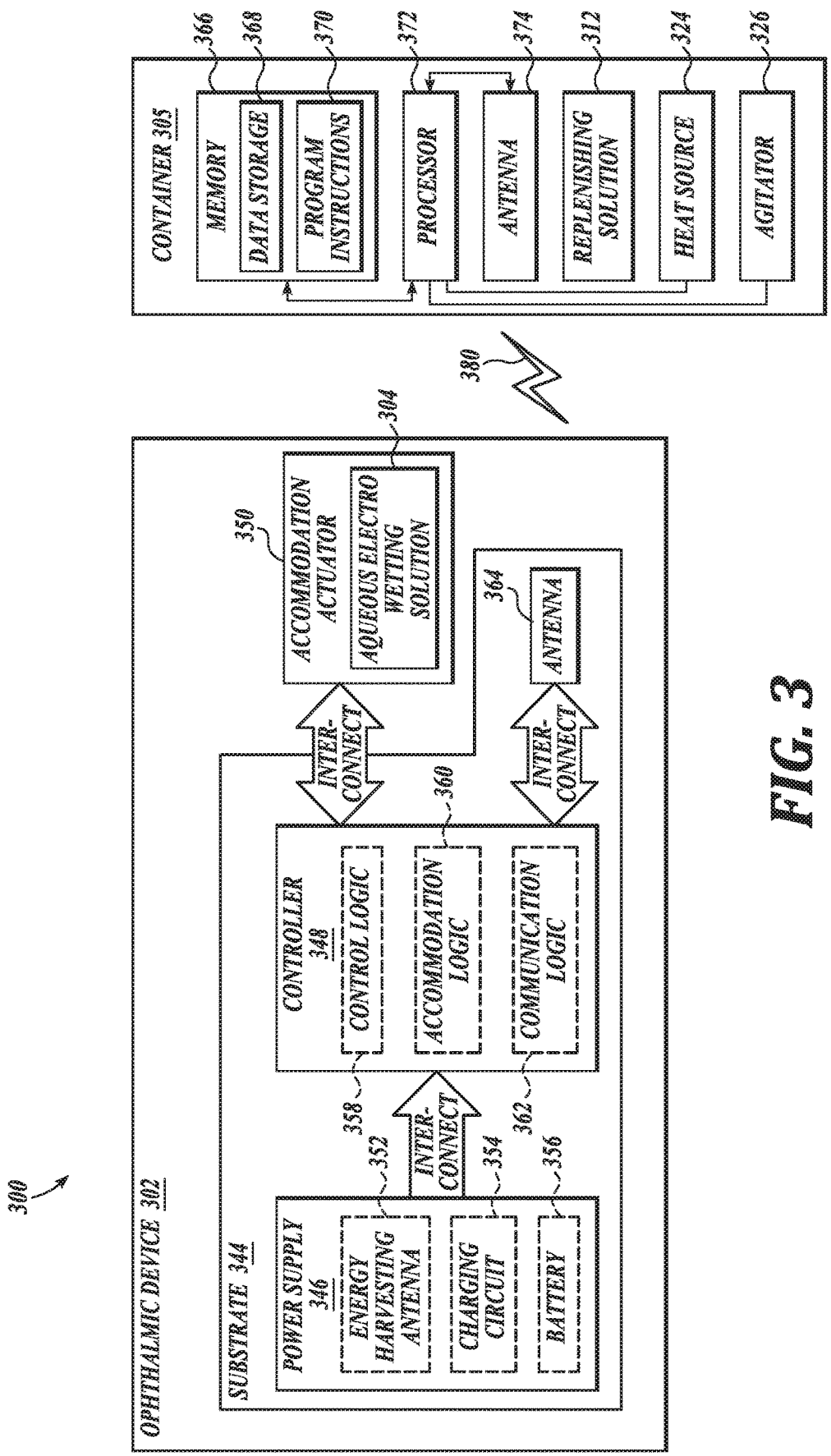
FIG. 3 is a functional block diagram of a system, in accordance with an embodiment of the disclosure.

FIG. 3 is a functional block diagram of a system 300, in accordance with an embodiment of the present disclosure. System 300 is shown to include an ophthalmic device 302, a container 305, and a replenishing solution 312, shown here disposed within the container 305.

Ophthalmic device 302 may be an electrowetting ophthalmic device 302, such as an electrowetting ophthalmic device 302 shaped to be mounted to a corneal surface of an eye. In an embodiment, ophthalmic device 302 is an example of electrowetting ophthalmic device 102. In the depicted embodiment, ophthalmic device 302 includes a substrate 344 configured to be mounted onto an eye, such as to a corneal surface of an eye. The substrate 344 is configured to provide a mounting surface for a power supply 346, a controller 348, an antenna 364, and various interconnects. The illustrated embodiment of power supply 346 includes an energy harvesting antenna 352, charging circuitry 354, and a battery 356. The illustrated embodiment of controller 348 includes control logic 358, accommodation logic 360, and communication logic 362.

Power supply 346 supplies operating voltages to the controller 348 and/or the accommodation actuator 350. Antenna 364 is operated by the controller 348 to receive power from container 305. In the illustrated embodiment, antenna 364, controller 348, and power supply 346 are disposed on/in substrate 344.

Substrate 344 includes one or more surfaces suitable for mounting controller 348, power supply 346, and antenna 364. Substrate 344 can be employed both as a mounting platform for chip-based circuitry (e.g., by flip-chip mounting) and/or as a platform for patterning conductive materials (e.g., gold, platinum, palladium, titanium, copper, aluminum, silver, metals, other conductive materials, combinations of these, etc.) to create electrodes, interconnects, antennae, etc. In some embodiments, substantially transparent conductive materials (e.g., indium tin oxide or silver nanowire mesh) can be patterned on substrate 344 to form circuitry, electrodes, etc. For example, antenna 364 can be formed by depositing a pattern of gold or another conductive material on substrate 344. Similarly, interconnects can be formed by depositing suitable patterns of conductive materials on substrate 344. A combination of resists, masks, and deposition techniques can be employed to pattern materials on substrate 344. Substrate 344 can be a relatively soft material, such as a polymer or another material sufficient to structurally support the circuitry and/or electronics while being flexible enough to be rolled or folded. Ophthalmic device 302 can alternatively be arranged with a group of unconnected substrates rather than a single substrate 344. For example, controller 348 and power supply 346 can be mounted to one substrate 344, while antenna 364 is mounted to another substrate and the two can be electrically connected via interconnects.

In the illustrated embodiment, power supply 346 includes a battery 356 to power the various embedded electronics, including controller 348. Battery 356 may be inductively charged by charging circuitry 354 and energy harvesting antenna 352. In one embodiment, antenna 364 and energy harvesting antenna 352 are independent antennae, which serve their respective functions of energy harvesting and communications. In another embodiment, energy harvesting antenna 352 and antenna 364 are the same physical antenna that are time shared for their respective functions of inductive charging and wireless communications with container 305. Additionally or alternatively, power supply 346 may include a solar cell ("photovoltaic cell") to capture energy from incoming ultraviolet, visible, and/or infrared radiation. Furthermore, an inertial power scavenging system can be included to capture energy from ambient vibrations.

Charging circuitry 354 may include a rectifier/regulator to condition the captured energy for charging battery 356 and/or directly power controller 348. Charging circuitry 354 may also include one or more energy storage devices to mitigate high frequency variations in energy harvesting antenna 352. For example, one or more energy storage devices (e.g., a capacitor, an inductor, etc.) can be connected to function as a low-pass filter.

Controller 348 contains logic to choreograph the operation of the other embedded components. Control logic 358 controls the general operation of ophthalmic device 302, including providing a logical user interface, power control functionality, etc. Accommodation logic 360 includes logic for receiving signals from sensors monitoring the orientation of the eye, determining the current gaze direction or focal distance of the user, and manipulating accommodation actuator 350 (focal distance of the contact lens) in response to these physical cues. The auto-accommodation can be implemented in real-time based upon feedback from gaze tracking, or permit the user to select specific accommodation regimes (e.g., near-field accommodation for reading, far-field accommodation for regular activities, etc.). Communication logic 362 provides communication protocols for wireless communication with container 305 via antenna 364. In one embodiment, communication logic 362 provides backscatter communication via antenna 364 when in the presence of an electromagnetic field 380 output from container 305. In one embodiment, communication logic 362 operates as a smart wireless radio-frequency identification ("RFID") tag that modulates the impedance of antenna 364 for backscatter wireless communications. The various logic modules of controller 348 may be implemented in software/firmware executed on a general purpose microprocessor, in hardware (e.g., application specific integrated circuit), or a combination of both.

Ophthalmic device 302 may include various other embedded electronics and logic modules. For example, a light source or pixel array may be included to provide visible feedback to the user. An accelerometer or gyroscope may be included to provide positional, rotational, directional or acceleration feedback information to controller 348.

The illustrated embodiment also includes container 305 with a processor 372, an antenna 374, and memory 366. In an embodiment, container 305 is an example of container 114. Memory 366 in container 305 includes data storage 368 and program instructions 370. As shown container 305 is separate from ophthalmic device 302, but may be placed in its proximity to charge ophthalmic device 302, send instructions to ophthalmic device 302, and/or replenish aqueous electrowetting solution 304 of the electrowetting ophthalmic device 302. In one embodiment, container 305 may resemble a conventional contact lens holder that the user places ophthalmic device 302 in at night to charge, replenish, clean the lens, etc. See, e.g., FIGS. 1A-1D.

Container 305 includes antenna 374 (or group of more than one antenna) to send wireless power 380 to ophthalmic device 302. Container 305 also includes a computing system with processor 372 in communication with memory 366. Memory 366 is a non-transitory computer-readable medium that can include, without limitation, magnetic disks, optical disks, organic memory, and/or any other volatile (e.g., RAM) or non-volatile (e.g., ROM) storage system readable by the processor 372. Memory 366 can include a data storage 368 to store indications of data, such as data logs (e.g., user logs), program settings (e.g., to adjust behavior of container 305), etc. Memory 366 can also include program instructions 370 for execution by processor 372 to cause the container 305 to perform processes specified by the instructions 370. For example, program instructions 370 can cause container 305 to heat and/or agitate replenishing solution 312 disposed in the container 305, such as with heat source 324 and agitator 326, respectively. Container 305 can also include one or more hardware components for operating antenna 374 to send and receive wireless signals 380 to and from ophthalmic device 302.

Figure 2:
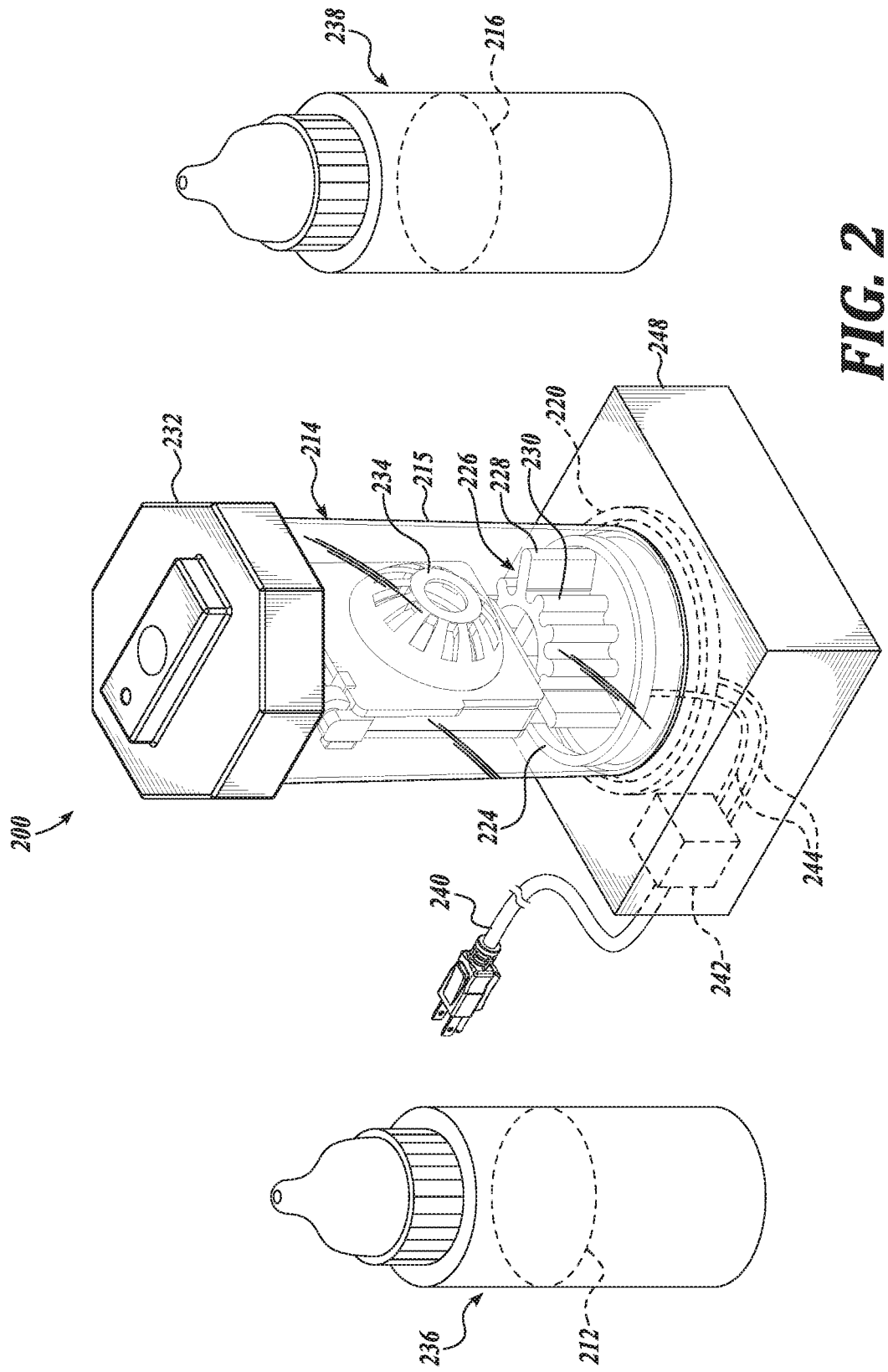
FIG. 2 is a perspective view of a kit, in accordance with an embodiment of the disclosure.

In another aspect, the present disclosure provides kits for replenishing an electrowetting ophthalmic device. In that regard, attention is directed to FIG. 2, in which a kit 200, in accordance with an embodiment of the disclosure, is illustrated. The kit 200 is shown to include a replenishing solution 212, shown here disposed in a replenishing solution container 236, and a container 214 shaped to carry the electrowetting ophthalmic device and the replenishing solution 212. As discussed further herein with respect to FIGS. 1A-1D, the container 214 is further shaped to position an electrowetting ophthalmic device carried by the container 214 in contact with the replenishing solution 212 when the electrowetting ophthalmic device is carried within the container 214. In this regard, the container 214 includes cages 234 hingedly coupled to cap 232 shaped to carry electrowetting ophthalmic devices, as described further herein with respect to FIG. 1D. Such cages 234 may be suitable to carry a pair of electrowetting ophthalmic devices. In an embodiment, the container 214 is shaped to position an electrowetting ophthalmic device of FIGS. 1A-1D or FIG. 3 to contact the replenishing solution 212.

The replenishing solution 212 is an aqueous solution suitable for replacing water in an electrowetting ophthalmic device. Water of the replenishing solution 212, such as in the form of water vapor, may be permeable through a lens material, such as a rigid gas-permeable lens material used in electrowetting ophthalmic devices. In an embodiment, the replenishing solution 212 has an osmolarity equal to or approximately equal to an osmolarity of an aqueous electrowetting solution of an electrowetting ophthalmic device, such as an initial or preferred osmolarity of the electrowetting ophthalmic device. As discussed further herein with respect to the system 100 of FIGS. 1A-1D, such a replenishing solution 212 is suitable to replace water lost from the aqueous electrowetting solution due to evaporation of a tear fluid and/or osmosis. In an embodiment, the replenishing solution 212 has an osmolarity higher than an osmolarity of a tear fluid. In an embodiment, the osmolarity of the replenishing solution 212 is greater than 290 mOsmol/L. In an embodiment, the osmolarity of the replenishing solution 212 is in a range of about 290 mOsmol/L to about 500 mOsmol/L. As discussed further herein with respect to the system 100 of FIGS. 1A-1D, such a high osmolarity replenishing solution 212 may be suitable for replenishing an aqueous electrowetting solution having a correspondingly and, in some embodiments, equally high osmolarity.

The kit 200 includes a rinsing solution 216 for rinsing an electrowetting ophthalmic device, shown disposed in a rinsing solution container 238. In an embodiment, the rinsing solution 216 has an osmolarity equal or approximately equal to an osmolarity of a tear fluid of an eye. In an embodiment, an osmolarity of the rinsing solution 216 is less than about 290 mOsmol/L. In an embodiment, an osmolarity of the rinsing solution 216 is in a range of about 150 mOsmol/L to about 290 mOsmol/L. As described further herein, where a replenishing solution 212 having an osmolarity higher than a tear fluid of an eye is used to replenish an aqueous electrowetting solution, a user may rinse the electrowetting ophthalmic device with a rinsing solution 216 having an osmolarity closer to an osmolarity of a tear fluid. Such a rinsing solution 216 may provide greater comfort to a user when the electrowetting ophthalmic device is mounted to an eye than the replenishing solution 212.

The container 214 is shown to further include a heat source 224 positioned to heat the replenishing solution 212 when carried by the container body portion 215. As shown, the heat source 224 is disposed within the container body portion 215 and operatively coupled to a controller 242 through electrical connection 244. Controller 242 is operatively coupled to electrical plug 240 and includes logic that, when executed by the controller 242, causes the kit 200 to perform operations including heating the heat source 224. Such heating is suitable to heat replenishing solution 212 in contact with the heat source 224. As discussed further herein with respect to the system 100 of FIGS. 1A-1D, in an embodiment, heating the replenishing solution 212 can be used to reach an equilibrium between the replenishing solution 212 and an aqueous electrowetting solution of an electrowetting ophthalmic device more quickly than in the absence of heating.

The container 214 further includes an agitator 226 positioned to agitate the replenishing solution 212 when carried by the container body portion 215. As shown the agitator 226 is positioned within the container body portion 215 to contact replenishing solution 212 disposed therein. In the illustrated embodiment, agitator 226 includes a catalyst 228, such as a metal catalyst 228, defining a number of fins 230. In an embodiment, the catalyst 228 is suitable to degrade a peroxide in the replenishing solution 212 to produce bubbles of gas. Such gas bubbles are suitable to agitate the replenishing solution 212 to accelerate an equilibration process between the replenishing solution 212 and an aqueous electrowetting solution of an electrowetting ophthalmic device.

The kit 200 is also shown to include a transmitter 220 disposed in a base portion 248 of the container 214 operatively coupled to the controller 242. The transmitter 220 is configured to inductively couple to a receiver of an electrowetting ophthalmic device, such as receiver 122 of electrowetting ophthalmic device 102, carried by the container 214, such as in one of the cages 234 of the container 214. In an embodiment, the controller 242 includes logic that, when executed by the controller 242, causes the kit 200 to perform operations including wirelessly transmitting power for receipt by the electrowetting ophthalmic device. In this regard, the kit 200 is configured to provide power to the electrowetting ophthalmic device while it is being replenished by the replenishing solution 212.

In an embodiment, a user uses the kit 200 by placing an electrowetting ophthalmic device in the container 214, placing the replenishing solution 212 in the container 212 with the electrowetting ophthalmic device, and activating the container 214 for a time and under conditions sufficient to replenish the electrowetting ophthalmic device. In an embodiment, activating the container 214 can include, amongst others, heating the replenishing solution 212, mixing the replenishing solution 212, and generating bubbles in the replenishing solution 212, as described further herein. After performing such a method, an osmolarity of an electrowetting solution of the electrowetting ophthalmic device becomes closer to or equal to the osmolarity of the replenishing solution over time. In an embodiment, the user may further rinse the replenished electrowetting ophthalmic device with the rinsing solution 216, thereby removing or diluting any replenishing solution 212 disposed on a surface of the electrowetting ophthalmic device, such that the electrowetting ophthalmic device may be comfortably placed on an eye. In an embodiment, the kit includes instructions for performing such a method.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system comprising:
   an electrowetting ophthalmic device including a lens material defining a cavity of an electrowetting lens encasing two immiscible liquids, wherein one of the two immiscible liquids is an aqueous electrowetting solution, wherein the lens material is permeable to a water vapor and the cavity depletes a first amount of water from the aqueous electrowetting solution through the lens material out of the electrowetting ophthalmic device while the electrowetting ophthalmic device is worn on an eye;
   a replenishing solution having a first osmolarity approximately equal to a target osmolarity for the aqueous electrowetting solution, wherein the replenishing solution replenishes at least a portion of the first amount of water while the electrowetting ophthalmic device is bathed within the replenishing solution by permeating the portion of the first amount of water through the lens material into the cavity from the replenishing solution; and
   a container shaped to removably carry the electrowetting ophthalmic device and the replenishing solution when the electrowetting ophthalmic device is not worn on an eye, the container configured to bathe the electrowetting ophthalmic device in-contact with the replenishing solution when the electrowetting ophthalmic device and the replenishing solution are carried by the container, wherein the container includes a resealable cap portion.

2. The system of claim 1, wherein the target osmolarity of the aqueous electrowetting solution is greater than 290 mOsmol/L.

3. The system of claim 2, further comprising a rinsing solution having a second osmolarity approximately equal to or less than 290 mOsmol/L.

4. The system of claim 1, wherein the container further comprises a transmitter positioned in or on the container to inductively couple with a receiver of the electrowetting ophthalmic device to transfer power wirelessly to the electrowetting ophthalmic device when the electrowetting ophthalmic device is carried within the container.

5. The system of claim 1, wherein the container further comprises a heat source coupled to a container body portion of the container and positioned to heat the replenishing solution when carried by the container, wherein the heat source is shaped as a ring and disposed at a bottom of the container body portion opposite the resealable cap portion.

6. The system of claim 1, wherein the container further comprises an agitator coupled to the resealable cap portion of the container to agitate the replenishing solution when the replenishing solution is carried by the container and when the resealable cap portion is coupled to a container body portion of the container.

7. The system of claim 1, wherein the replenishing solution further comprises one or more surfactants.

8. The system of claim 7, wherein the one or more surfactants have a molecular weight of greater than about 2,000 g/mole.

9. The system of claim 7, wherein the one or more surfactants have a hydrophilicity/lipophilicity balance of about 20.

10. The system of claim 1, wherein the replenishing solution further comprises a peroxide; and wherein the container further comprises a catalyst positioned to contact the replenishing solution when carried by the container and configured to degrade the peroxide.

11. The system of claim 6, wherein the agitator is coupled to the removeable cap portion of the container via a cage shaped to hold the electrowetting ophthalmic device such that the agitator and the cage are removed from the container body portion when the removeable cap portion is removed from the container body portion.

12. The system of claim 11, wherein the agitator is statically coupled to the removeable cap portion via the cage and does not move relative to the removeable cap portion.

13. The system of claim 12, wherein the agitator comprises a catalyst in a shape of a plurality of fins and wherein the catalyst reacts with the replenishing solution to generate gas bubbles that agitate the replenishing solution.

14. The system of claim 13, further comprising a heat source disposed on a base portion of the container and shaped as a ring that encircles the agitator when the removeable cap portion is attached to the container body portion.

15. The system of claim 11, wherein the agitator is disposed below the cage within the replenishing solution when the removeable cap portion is attached to the container body portion while carrying the replenishing solution.

* * * * *